No. 859,980. PATENTED JULY 16, 1907.
L. A. SCHAEFFER.
CIGAR MACHINE.
APPLICATION FILED JUNE 15, 1901.

ATTEST

INVENTOR
Lester A. Schaeffer
By H. T. Fisher ATTY

No. 859,980. PATENTED JULY 16, 1907.
L. A. SCHAEFFER.
CIGAR MACHINE.
APPLICATION FILED JUNE 15, 1901.

No. 859,980. PATENTED JULY 16, 1907.
L. A. SCHAEFFER.
CIGAR MACHINE.
APPLICATION FILED JUNE 15, 1901.

No. 859,980. PATENTED JULY 16, 1907.
L. A. SCHAEFFER.
CIGAR MACHINE.
APPLICATION FILED JUNE 15, 1901.

No. 859,980. PATENTED JULY 16, 1907.
L. A. SCHAEFFER.
CIGAR MACHINE.
APPLICATION FILED JUNE 15, 1901.
10 SHEETS—SHEET 5.

ATTEST
R. B. Moser
E. M. Fisher

INVENTOR
Lester A. Schaeffer
By H. F. Fisher ATTY

No. 859,980. PATENTED JULY 16, 1907.
L. A. SCHAEFFER.
CIGAR MACHINE.
APPLICATION FILED JUNE 15, 1901.

PATENTED JULY 16, 1907.

L. A. SCHAEFFER.
CIGAR MACHINE.
APPLICATION FILED JUNE 15, 1901.

ATTEST
R. B. Moser
E. M. Fisher

INVENTOR.
By Lester A. Schaeffer
H. F. Fisher ATTY

No. 859,980. PATENTED JULY 16, 1907.
L. A. SCHAEFFER.
CIGAR MACHINE.
APPLICATION FILED JUNE 15, 1901.

ATTEST
R. B. Moser
E. M. Fisher

INVENTOR.
Lester A. Schaeffer
BY H. F. Fisher ATTY

No. 859,980. PATENTED JULY 16, 1907.
L. A. SCHAEFFER.
CIGAR MACHINE.
APPLICATION FILED JUNE 15, 1901.

No. 859,980. PATENTED JULY 16, 1907.
L. A. SCHAEFFER.
CIGAR MACHINE.
APPLICATION FILED JUNE 15, 1901.
10 SHEETS—SHEET 10.

UNITED STATES PATENT OFFICE.

LESTER A. SCHAEFFER, OF DAYTON, OHIO, ASSIGNOR OF TWO-FIFTHS TO EDGAR A. SCHAEFFER AND B. D. ANNEWALT, OF CLEVELAND, OHIO.

CIGAR-MACHINE.

No. 859,980.          Specification of Letters Patent.          Patented July 16, 1907.

Application filed June 15, 1901. Serial No. 64,738.

*To all whom it may concern:*

Be it known that I, LESTER A. SCHAEFFER, a citizen of the United States, residing at Dayton, in the county of Montgomery and State of Ohio, have invented certain new and useful Improvements in Cigar-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cigar machines, and the invention consists in a machine constructed and operating substantially as shown and described and particularly pointed out in the claims.

In the accompanying drawings.

In the machine thus shown I provide, first, for cutting a wrapper, secondly, for pasting the same and, thirdly and lastly, for rolling the cigar, and the three operations are successive and continuous while the machine is at work, as will clearly appear in the further description.

The present machine is manually operated, but I may employ any available power and make the machine automatic without departing from the essential features of the invention.

A is the working table, and B its supporting frame. All the more material operating parts are on or above table A, and are comprised practically in two main groups. The first of these groups has to do with the cutting of the wrapper, and the other and second group with the wrapping of the bunch, while the pasting of the wrapper comes incidentally between these two.

Figure 6:
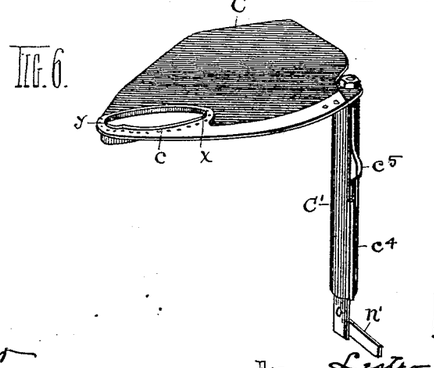
Fig. 6 is a perspective detail of the die plate and its standard.

Taking up the groups in their natural order, we have first, a die or wrapper cutting plate C, Fig. 6, provided with a standard C'. The said plate is provided with a cutting edge or die $c$ of oblong shape conforming to the shape of the wrapper to be cut. The space within said die is open, and thus when the wrapper has been cut it comes within the same and is surrendered to the mechanism immediately beneath as will now be seen. Thus E is an air suction chamber having an exhaust connection E' beneath, and D is a rolling-board over said chamber and has an opening adapted to receive perforated or open work suction blank G. Said blank or blank-plate is also to be raised into the die-plate, and is referred to hereinafter as a suction or die-blank which serves to receive the wrapper from the die and hold it on the rolling-board through the perforated apron. The rolling-board is perforated about the edge of this so-called die-blank so that it coöperates with said plate through suction in holding the leaf for cutting. After the wrapper is cut the said blank G drops down flush with the rolling-board and constitutes a part thereof.

Figure 12:
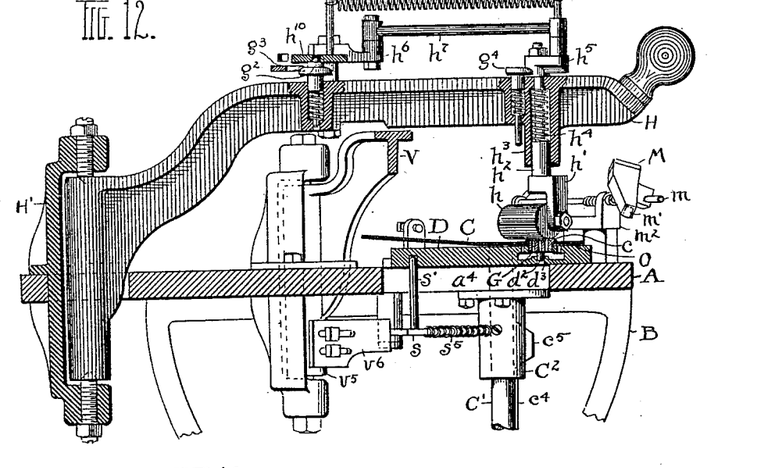
Fig. 12 is a cross section of the machine on a line corresponding to B, B, Fig. 10, and with the parts in position as shown in said figure.

Now, having die-plate C made and equipped as shown, I employ therewith a hand lever H, fulcrumed at its outer extremity in a suitable bracket H' on table A and adapted to swing over the table back and forth in a horizontal plane. Upon this lever is a wrapper cutter roller $h$, Fig. 12, journaled at its ends in bracket $h'$ having a spindle $h^2$ supported in a vertical socket $h^3$ in lever H. A coiled spring $h^4$ about the upper reduced portion of said spindle in socket $h^3$ exerts a constant downward pressure, and a crank $h^5$ at the top of said spindle above lever H has connections for rotating the same and thus reversing the position of roller $h$, as it travels over the cutter die $c$ in a circuit, as will be seen.

Figure 1:
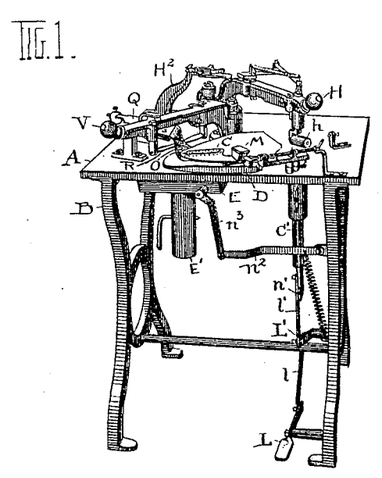
Figure 1 is a perspective front view of the machine with the parts in normal relation.

At this point I may explain that I find very material advantage in following around the edge of the die with the cutter roller and cutting at only a single point rather than cutting broadly across the die at one sweep of the roller, for the reason, first, that by cutting across the whole roller at a time there is great danger of defective cutting at some point here or there and which leaves the wrapper unsevered from the leaf at such point. This is especially liable to occur at the ends of the die where the edges dull most easily, and sometimes it occurs more or less along the sides as well. But by running the roller around the circuit of the die I cut at only one point as I go and both avoid the objection of dulling some one or other portion of the cutter more than others, and the serious objection of leaving some parts uncut and thus being unable to proceed until the wrapper is otherwise relieved. Furthermore, I get essentially a shearing cut all the way around by reason of the shape of the die and the operative position of the roller in respect to the die, so that I never fail to sever the wrapper all around and in no less time than the other way. Now, in doing this work roller $h$ adapts itself to the edge of the die and switches around at both arcs, $x$ and $y$, and cuts here also as it goes. Normally, said roller is entirely clear of the die-plate, Fig. 5, and the space above said plate is otherwise unobstructed to allow said plate to be raised. But when lever H is carried to the left the roller first strikes the arc $x$, Fig. 11, and travels over the near edge of the die to the other arc $y$. Once there its spindle is axially and automatically reversed which causes the roller to travel back on the inner side of the die, as it has done in dotted lines at the right in Fig. 11. From this latter point it turns to the intersection of its original position on arc $x$ and at the same time is automatically reversed to starting position, full lines. The mechanism for effecting these operations is mostly carried by lever H, and consists of a reversing or switching crank $h^6$, rod $h^7$ connecting crank $h^6$ with crank $h^5$, Figs. 5 and 12, spring $h^8$ likewise connected to crank $h^5$, and at its other end to cam $h^{10}$ on crank $h^6$ inward from its pivot $h^9$ on lever H. Crank $h^6$ has a cam $g$ directly off its pivot to the rear adapted to be engaged by a fixed projection $g'$ on stationary arm $H^2$, Fig. 5, as reversal of roller $h$ is to be made and as shown as partially turned in, Fig. 9. Once at this point a further push of lever H to the left throws crank $h^5$ by means of projection $g'$ past its center and brings it under the pull of spring $h^8$ to complete the reversal. Then the parts instantly assume position as in Fig. 10, and the reversing action of spring $h^8$ is temporarily suspended by spring pressed headed bolt $g^2$ engaging at its upper point in a hole in cam $h^{10}$, thus for the time connecting said parts rigidly, as in Fig. 12. Upon returning lever H to normal position an arm $g^3$, with a beveled edge and operating as a cam enters over the flanged head of bolt $g^2$ and depresses it sufficiently to disengage its top point from cam $h^{10}$, thus liberating the parts again to the pull of spring $h^8$. As this disengagement occurs the roller $h$ has reached the reversing point of the arc $x$ of the wrapper cutting die, and spring $h^8$ instantaneously reverses roller $h$ through its operating and associated parts back to normal position, Fig. 1.

Figure 13:
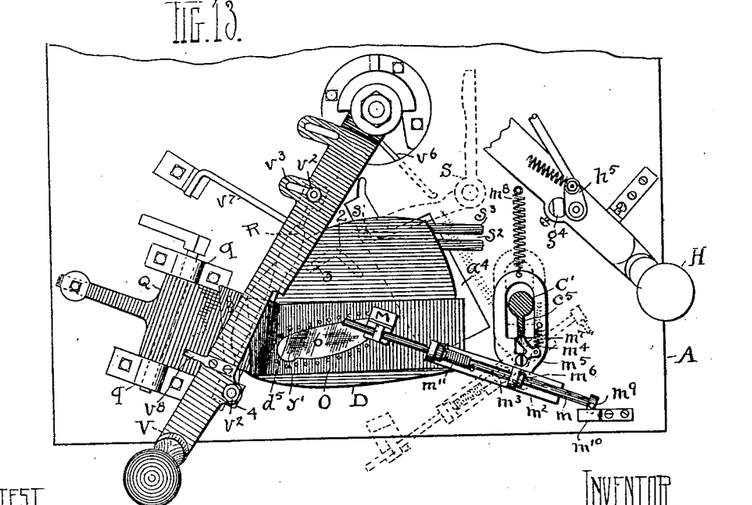
Fig. 13 is a plan view of the machine seen as when the die-plate is in its raised position but with said plate removed and showing the paster over the cut wrapper, and with the rolling-board in its normal position.

Incident to the last reverse action of roller $h$ by spring $h^8$ there is such impetus given to the roller that it at once assumes its right working position, but spring $h^8$ would carry it back out of this position more or less if not prevented. To this end I employ a spring pressed bolt $g^4$, Figs. 12 and 13. Normally said bolt is up, and is only depressed when crank $h^5$ rides over it, said crank being beveled on one side to do so. Bolt $g^4$ is acting as a backstop in Figs. 12 and 13, and always when the parts are in normal position.

Figure 9:
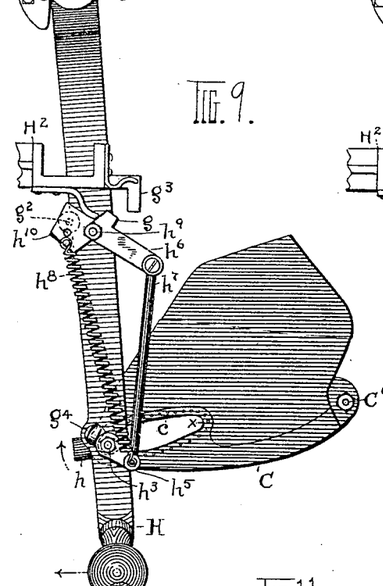
Fig. 9 is a plan view of the wrapper cutter arm and die-plate with the said arm at the second arc of the said plate.
Figure 10:
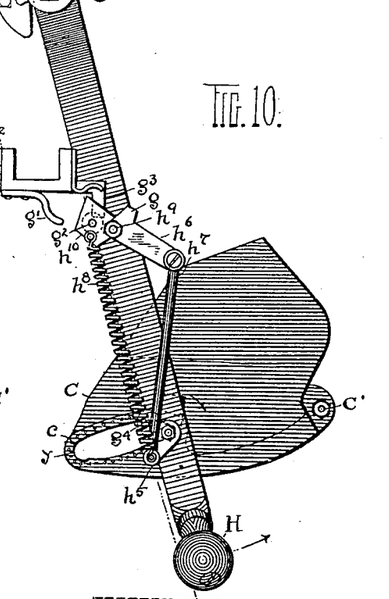
Fig. 10 is a plan view of the cutter arm and die-plate, showing the roller actuating mechanism on said arm as about to be released for the action of the spring and with the roller in position to turn on the arc beneath.
Figure 11:
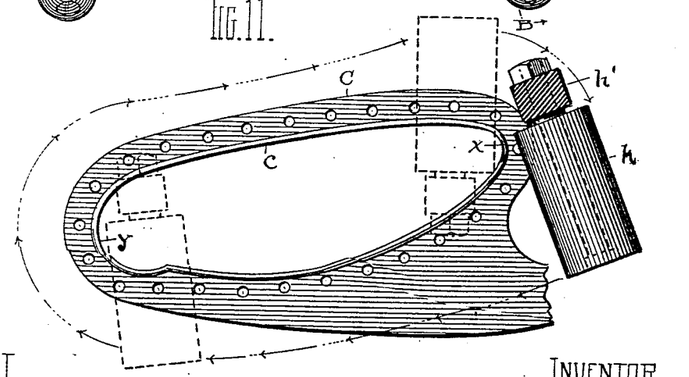
Fig. 11 is an enlarged diagrammatic view of the die-plate, showing the roller at the right in full lines in its normal position, and at the left in its position corresponding substantially to Fig. 9, and again at the right in dotted lines in position corresponding substantially to Fig. 10.

Roller $h$ is in initial but opposite reversing positions in both Figs. 9 and 10, and in corresponding positions in dotted lines Fig. 11, and the reversal thereof and the other details of its operation will be understood from the description already given.

Figure 5:
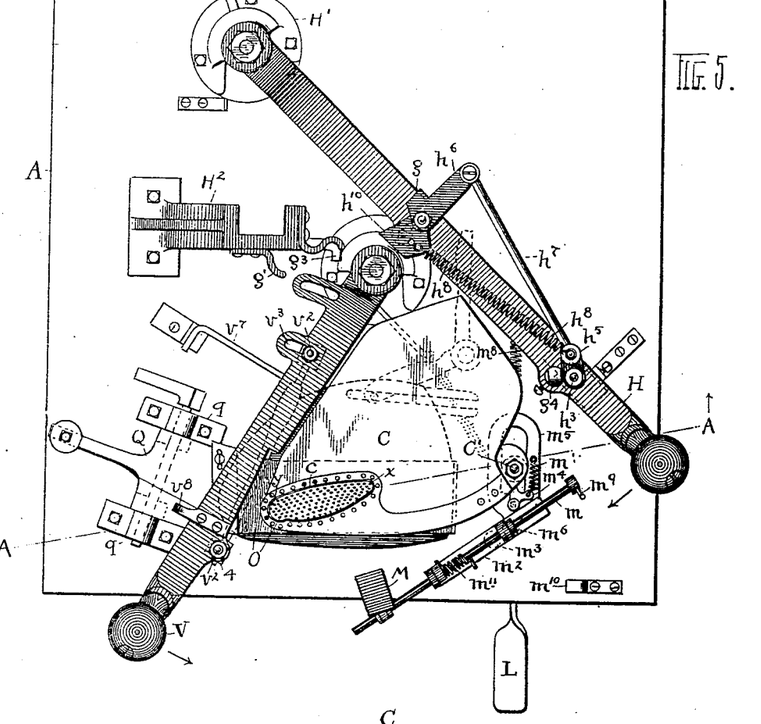
Fig. 5 is a plan view of the machine with the parts in their normal relation, as in Fig. 1.
Figure 7:
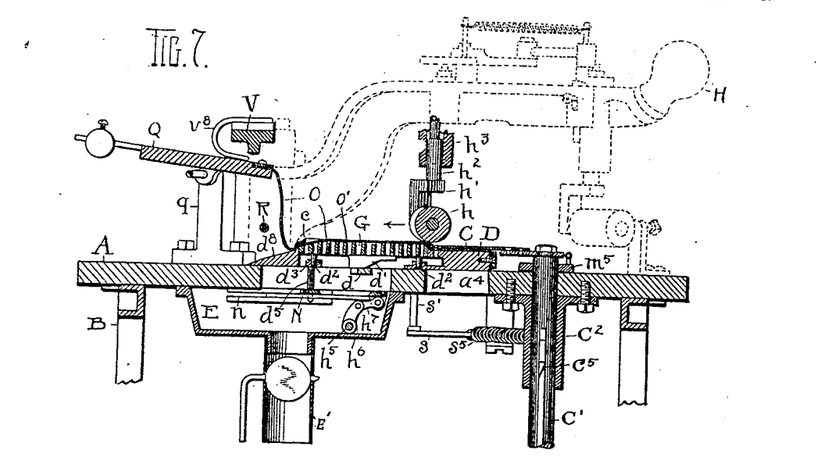
Fig. 7 is a sectional elevation of the machine on a line corresponding substantially to A, A, Fig. 5.

Assuming now that lever H is in normal position, Figs. 5 and 7, it first assumes position as to the die as it is moved up to full lines Fig. 11, and then travels around upon the edge of the die and reverses upon its arcs as already described and with the operating parts relatively as seen in Figs. 9 and 10, just before each reversal occurs.

Having traversed the die and cut a wrapper the next step in the operation is to paste the wrapper. To do this I first raise the die-plate not only out of the way for rolling but into a position where I can place the leaf on the die in position for cutting another wrapper while the other operations are going on beneath. This is especially convenient when power is employed to actuate the parts, but an expert operator can manipulate the leaf with one hand and the rolling mechanism with the other and thus practically conduct both operations at the same time and materially enhance the speed of the machine over a construction in which one operation must wait until the other is concluded.

Figure 3:
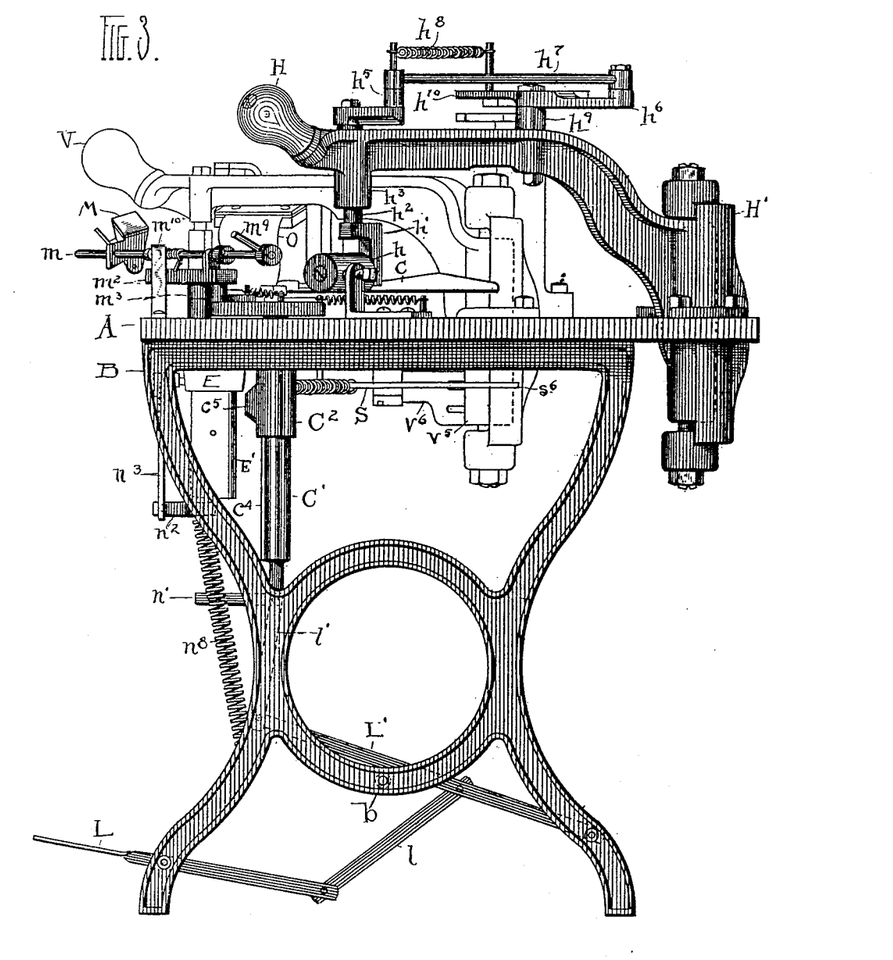
Fig. 3 is an end elevation of the machine looking inward from the right of Fig. 1.

The means for raising the die plate comprise its own standard C', pedal lever L, secondary lever L', a link $l$ connecting said levers, and link $l'$ connecting the secondary lever L' with the lower end of said standard C'. Both levers L and L' are pivoted in frame B, as clearly seen in Fig. 3, and standard C' is supported in a tubular guide $C^2$ fastened beneath the table. Thus the die-plate is raised by depressing pedal L, and it quickly gravitates back to normal position over the rolling-board when the foot is removed. A spline $c^4$ on said standard running in a slot in the guide $C^2$ keeps it from rotating, and a cam projection $c^5$ on said standard in the line of said spline works the pasting device, as we shall see. In the present construction the round $b$ of frame B serves also as a stop for both the up and the down movements of the pedal-lever and the mechanism actuated thereby, but in a sense this is incidental and any suitable stop may be employed, if needed.

Figure 16:
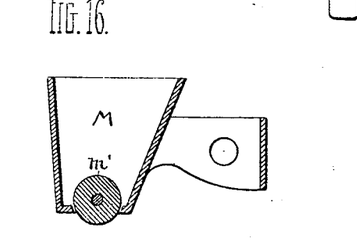
Fig. 16 is a cross section of the paste receptacle and its roller.

Before wrapping and when the wrapper has been otherwise prepared for rolling it is pasted. This is done by means of a pasting device automatically operated from die-plate standard C′, and comprises a paste receptacle M, Figs. 12, 13 and 16, mounted on a shaft $m$ and having a slotted bottom with a roller $m'$ to distribute the paste. Shaft $m$ is rotatably supported in bracket $m^2$ on table A, which is pivotally mounted on vertical post $m^3$ on table A, and horizontally movable to and fro over the wrapper on the rolling-board, Fig. 13. Normally the paster is out of action as in dotted lines in said figure, and as seen in full lines it is pasting. The change from dotted to full lines is brought about by cam C⁵ on the standard C′ striking a horizontally pivoted tappet $m^4$ on a lengthwise slidable piece $m^5$ with an oblong opening engaged over or about the standard C′. The said piece $m^5$ is connected with bracket $m^2$ by a pivot $m^6$ behind its own pivot post, so that a comparatively slow movement here gives a large sweep to receptacle M, and the direct actuation occurs when cam $c^5$ on standard C′ is raised as the die-plate goes up and strikes the tappet $m^4$ and rotates the paste receptacle to full lines Fig. 13. Then as said cam passes on above said tappet its own spring $m^7$ restores it to original position, while spring $m^8$ also restores the sliding piece $m^5$ and the paster connected therewith to original position Figs. 5 and 12. In these operations the paste receptacle becomes slightly tilted or rotated from its normal to its operating position by means of a finger $m^9$ on the outer extremity of shaft $m$ engaging an arm or projection $m^{10}$ on table A, and spring $m^{11}$ restores said receptacle to normal position, Fig. 12, when finger $m^9$ is disengaged. This tilting is momentary and timed to bring the paste roller in contact with the wrapper and cause paste to be deposited thereon.

The cam $c^5$ is beveled at its outer edge to match with the beveled inner edge of the tappet $m^4$, so that when said cam descends it simply crowds the tappet aside enough to pass below and none of the other parts are disturbed. But when rising said cam bears directly against the end of the tappet and thus does not cause it to rotate on its pivot. Thus the raising of the die-plate and the pasting of the wrapper become a simultaneous operation.

Now, having cut the wrapper and pasted it, the next and final performance is to roll the cigar. It has already been noted that there is a so-called blank-plate G which coöperates in one position with the die-plate and in the other with the rolling-board D, and that said plate is movable up and down within limits independently of these parts. It is up when the wrapper is being cut, Fig. 7, and down when it is being rolled, Fig. 8. When cut the wrapper is held upon this plate on perforated apron O by suction from chamber E. The raising of said plate occurs when the rolling board is brought to normal position, Fig. 7, and it is lowered when said board is caused to slide to the left, Fig. 8. The means for making this change consist simply of a cross piece $d$ at the top of chamber E and a bevel edged block $d'$ on the bottom of plate G which rides up on said cross piece and raises said plate proportionately when the rolling-board is carried from position Fig. 8 to position Fig. 7. The said plate G has guide pins $d^2$ working in cross pieces $d^3$ in the rolling-board, and said board is horizontally movable on vertical pivot pin $d^5$ which stands up from a so-called reciprocating carriage N beneath. Said carriage is slidable back and forth in guideways $n$ at the top and sides of suction chamber E beneath table A, and is operated from the pedal mechanism for raising the die-plate by means of a projection $n'$ rigid with standard C′ engaging beneath lever $n^2$, Fig. 8. This lever is pivoted at one end to the frame B and at the other end is operatively connected by link $n^3$ with crank arm $n^3$ on transverse shaft $n^5$ supported by the walls of chamber E. Another arm $n^6$ on said shaft is connected by link $n^7$ with carriage N, and so it occurs when the die plate has been practically raised and the pasting of the wrapper is effected that a little further depression of pedal L causes projection $n'$ to strike lever $n^2$ and put in motion the further mechanism which bodily shifts the rolling-board from normal position, Fig. 7, to secondary position Fig. 8. Of course the pivot $d^5$ of said board is carried along with this movement as it is fixed on the reciprocating carriage N, as clearly shown. This backward movement of the rolling-board is preparatory to the forming of the requisite rolling pocket in apron O, as will be seen. A retracting spring $n^8$ on the lever $n^2$ operates to carry the rolling-board back to normal position when pressure through the pedal is withdrawn. The rolling-board has a tapered or cut away upper portion $d^8$ on its initial end where the pocketing of the bunch for forming the cigar occurs, and said apron is secured to said board at one end and to the pivoted counter-weighted head Q at its other end, and is long enough to afford the necessary slack between these points in all the formative movements.

Figure 17:
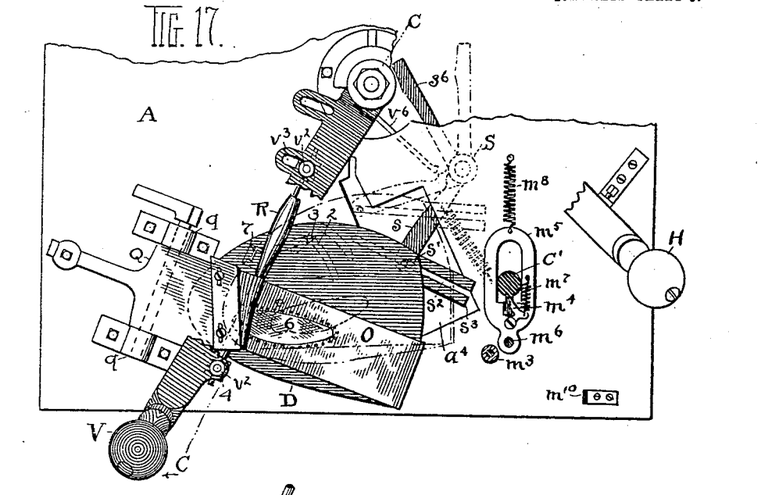
Fig. 17 is a plan view substantially the same as Fig. 13, but with the rolling-board shifted to the left and in full lines.

Now, in addition to the back and forth movement of the rolling-board through carriage N it has a compound pivot movement as well. The first of these pivotal movements occurs with the direct forward movement through carriage N under actuation from the pedal L and is automatically produced by arm $s$ of bell crank lever S pivoted to the under side of the table and which has a pin $s'$ on its end working in the straight slot $s^2$ in projection $s^3$ rigid with the rolling-board at the inner corner of its free end. The slot $s^2$ also runs into the rolling-board, as here shown, and a spring $s^5$ controls arm $s$ when it is otherwise free and causes it to move the rolling-board toward the operator, say from dotted lines, Fig. 17, to full lines therein. The rolling-board is shown further as having a nearly right angled cam slot 2 back of slotted arm $s$, in which there is engaged a pin 3 projecting from the table beneath and helping to govern the movements of the rolling-board, as will be seen. Normally pin or lug 3 is down in the short arm of slot 2, dotted position Fig. 17, while pin $s'$ on arm $s$ is at the inner end of slot $s^2$. In this position of the parts bell crank lever S is free to rotate and subject to pull of spring $s^5$. Then as the rolling-board is moved inward by its carriage N the free outer end thereof is moved toward the operator by arm $s$ and pin 3 runs into the angle of slot 2. This compound forward and turning movement of the rolling-board is in a sense one movement, the turning of the board being on its pivot $d^5$ on the carriage N moving directly forward at the same time. Finally, the said board has a reverse and inward turning movement, with its fixed pivot $d^5$ as its center of rotation and the outer longer arm of slot 2 its governing radius. This second and last turn of said board is, therefore, within the limits of this slot, in which the travel is from position Fig. 18 to position Fig. 20, and with pin 3 at last brought to the extremity of slot 2. These movements are coöperative with other bunch rolling parts and their purpose appears clearly in the description of operation further along.

Figure 4:
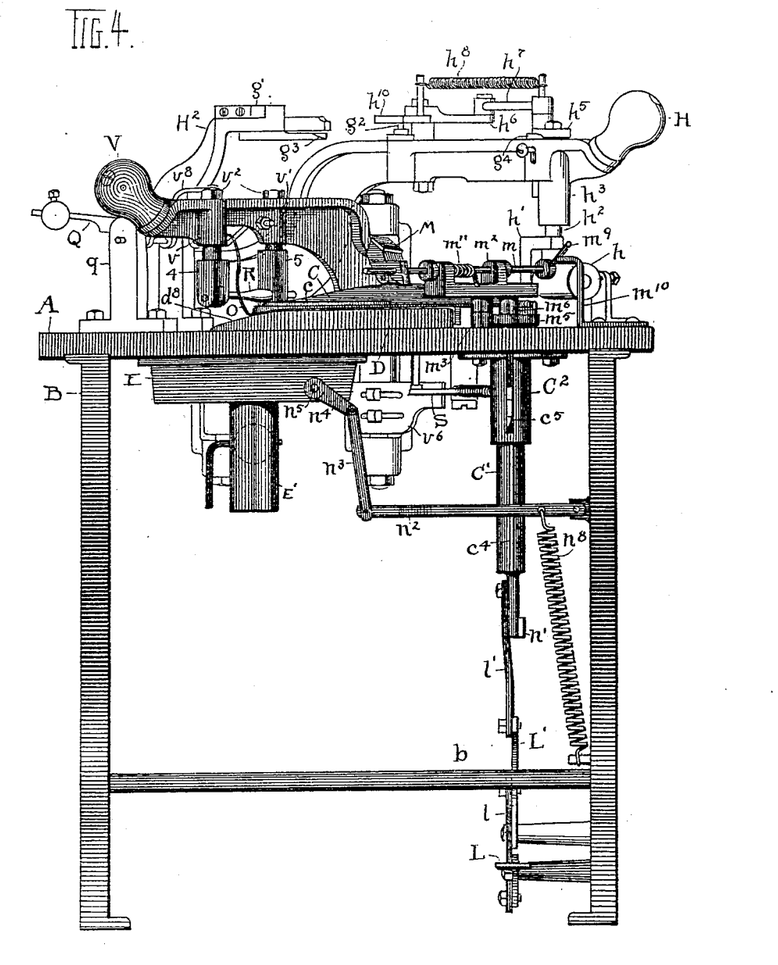
Fig. 4 is a direct front elevation thereof and corresponding in the main to Fig. 1.
Figures 14, 15:
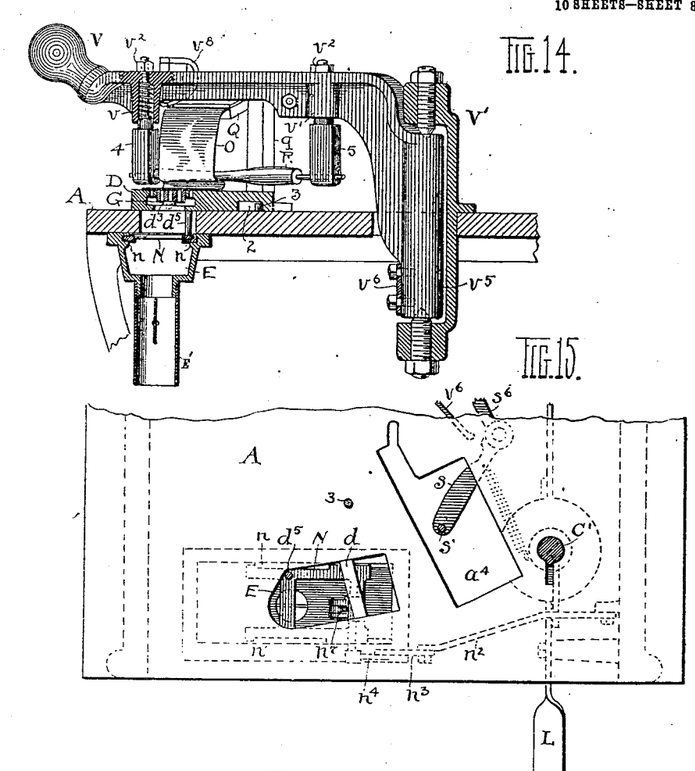
Fig. 14 is a cross section of the machine on line C, C, Fig. 17.
Fig. 15 is a plan view of the table on line D, D, Fig. 8, with the parts above said line removed.
Figure 19:
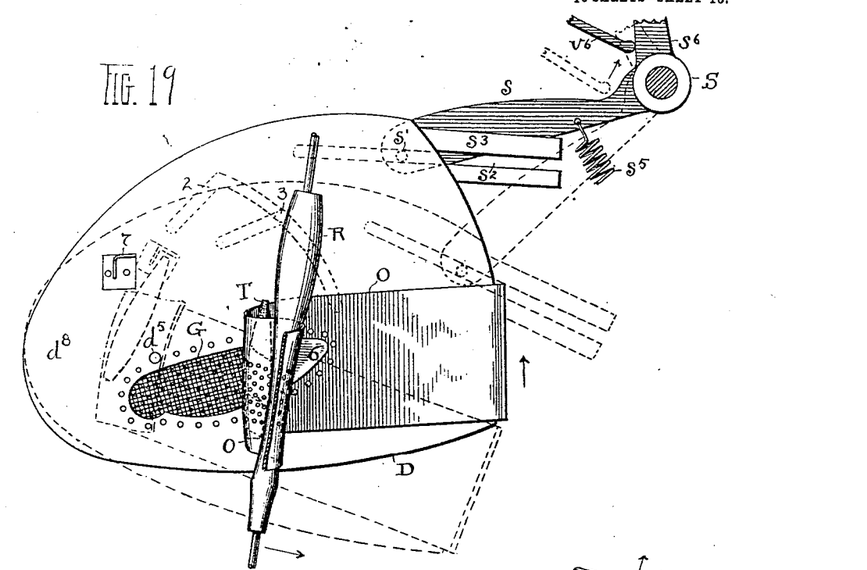
Fig. 19 is a plan view of the rolling-board and certain other parts, showing the cigar partly rolled.

A suitable bunch roller R, shaped preferable about as shown Figs. 19 and 14, is supported at its ends in bearings in screws 4 and 5 on lever V. Said screws, so-called, are supported in sockets $v$ and $v'$, respectively, on lever V, and are threaded at their upper ends and engaged each by a nut $v^2$, so that they are adjustable in said lever, and the screw 5 at the rear has also a lateral adjustment in slot $v^3$. Normally the said roller is behind the rolling apron relatively as seen in Figs. 4 and 7. From this position it moves forward over the said apron and first of all assists in forming a pocket for the bunch, Fig. 8, and as also will appear further along.

Lever V has a hub $v^5$ mounted in a bracket V' upon the table, Fig. 14, in which it is held firmly to a horizontal movement, so that the roller R will be kept down to its work, less such yield as its own immediate support may provide. Upon the hub $v^5$ of lever V beneath table A is an arm $v^6$ which engages bell crank arm $s^6$ when said lever is drawn forward a full stroke, and this through the other bell-crank arm $s$ working in the rolling-board carries said board around on its last above mentioned movement from position Fig. 18 through Fig. 19 to Fig. 20.

The rocking head Q is pivoted in a suitable bracket or like support $q$ and is counterweighted as already suggested to take up slack in apron O and thus coöperate in some measure in wrapping the cigar. Normally said head is engaged beneath lever V at its front, Figs. 3 and 5, and it is mechanically turned down at front from its otherwise tilted position by a finger $v^8$ on said lever.

Figure 2:
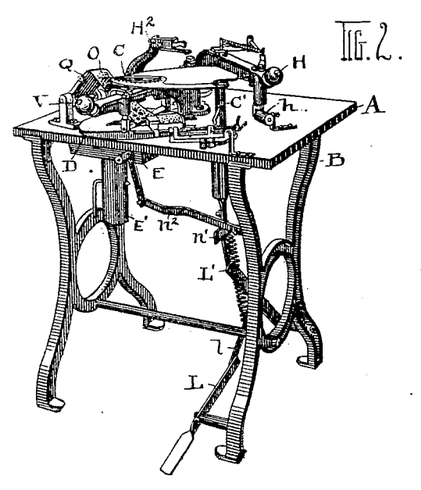
Fig. 2 is a perspective diagonal view thereof showing the parts with the die in raised position.
Figure 18:
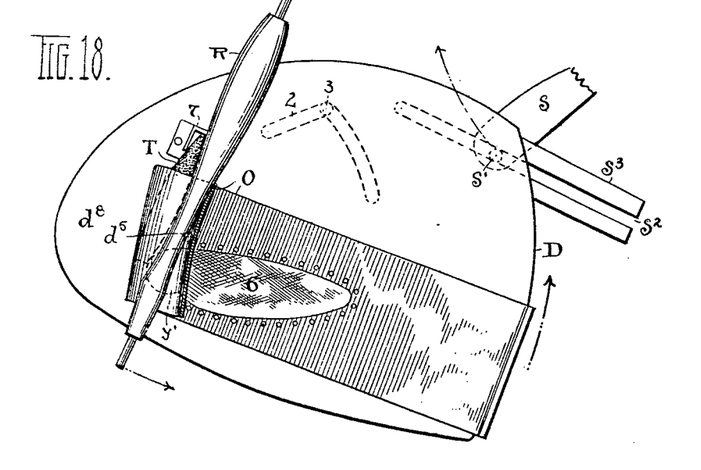
Fig. 18 is a plan view of the rolling-board and roller and other parts which are in position substantially as hereinafter fully described.
Figure 20:
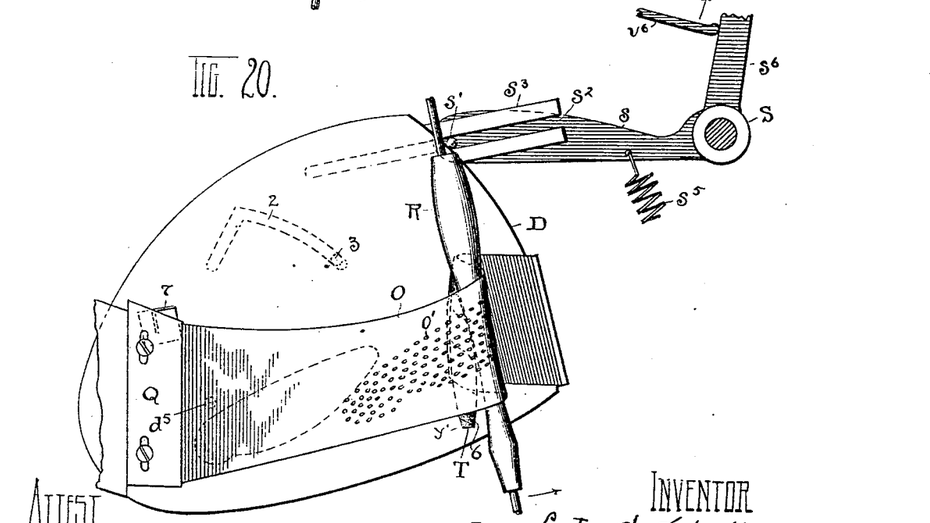
Fig. 20 is a plan view of the rolling board and other parts seen in Fig. 17, but showing the end of the wrapping operation as hereinafter fully described.

The operations of the machine briefly stated are as follows: A wrapper having been cut on the die-plate it is held upon the apron over blank-plate G in the rolling-board by atmospheric pressure while the die-plate itself is raised, Figs. 2 and 8. The same operation shifts the rolling-board to its first working position in full lines Figs. 8, 18. These views show the relation of bunch T and wrapper 6 to the pocket for the bunch formed in apron O beneath lever V and behind roller R, and all this occurs by the shifting of the rolling-board and the consequent pocketing of the apron in its slack beneath and behind roller R. The bunch T is now inserted in said pocket against stop 7, or the bunch may be placed on the apron against said stop just before the rolling board moves to the left, and then everything is ready for the quick work of wrapping by a forward sweep of lever V. As seen in Fig. 18, the lay of the pocket apron is substantially at right angles across the plane of bunch-roller R, and hence as the roller passes over the said apron in the arc of a circle it will first tightly gather up the apron at the tuck end of the bunch and thus begin by rolling the wrapper tightly on the tuck end of the bunch after the manner of hand work. But the rolling-board and the apron and wrapper begin at the same time to swing inward on an arc from pivot $d^5$, and so it occurs when the parts reach position, Fig. 19, that the pull on the apron from tension device Q has traveled from the tuck end of the bunch to about its middle, and by the time position Fig. 20 is reached the slack of the apron has come wholly to the front or tuck end of the bunch or cigar while the tightest wound portion or wrapping of the apron is at the mouth or pointed end of the now completed cigar. In all these changing positions the bunch itself travels on about the same radius as the roller, but yet it has a diagonal travel in respect to and over the wrapper and thus gets a spiral winding of the wrapper while it travels or rolls on an arc across the same. As the wrapper is being wound about the bunch, the rolling board swings on its pivot and carries the unwrapped portion of the wrapper on the apron around with it and whereby the spiral winding of the wrapper on the bunch is further facilitated. In this movement the initial end or tuck $y'$ of the wrapper is first tucked under the bunch and then the rolling and wrapping follow in one operation but with something of a dual movement as above described. The effect of the wrapping is identical with hand work but the steps in the work differ especially in this, that in hand wrapping the bunch is changed in position on the wrapper as the winding progresses from end to end, while here I roll the bunch in the arc of a circle and change the position of the wrapper itself to get the desired spirality and tightness of the wrap at all points. The enlargement of the inner end of roll R materially facilitates the winding of the wrapper closely about the point of the bunch. It will thus be seen that this machine holds the wrapper on the rolling-board over the apron where it is cut and that the bunch is brought to it and wrapped without changing the position of the wrapper upon the apron at all. The cigar is completed as the roller R passes out upon the end of the rolling-board and it is cast off down through opening $a^4$ in the table, Fig. 13, and lever V is moved back to normal position.

Figure 8:
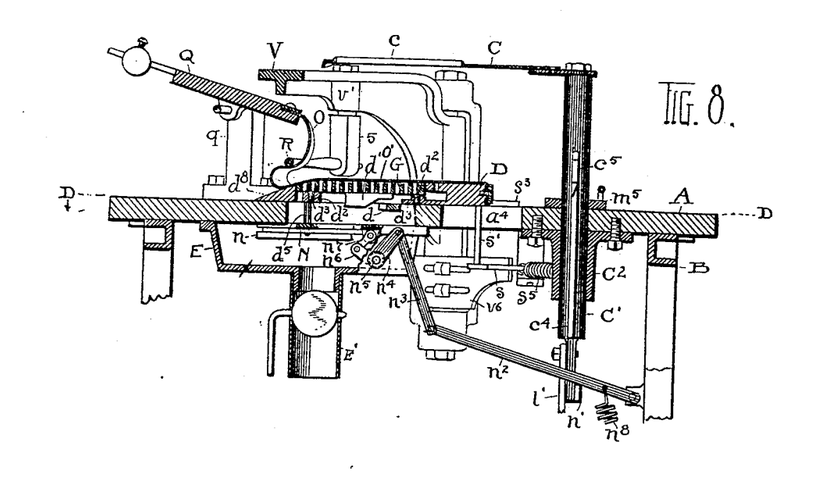
Fig. 8 is a sectional elevation on line A, A, Fig. 5, corresponding to Fig. 7 in this particular, but showing the die-plate raised, and the rolling-board shifted part way and omitting certain features seen in Fig. 7.

The importance of having the rolling-board reduced or thinned at its inner end becomes apparent in connection with the pocket in the apron and the placing of the bunch therein preparatory to wrapping, Fig. 8, because this reduction of the board not only affords room for the pocket but also for the insertion of the bunch, and by reason of the construction and arrangement of the parts the said pocket is formed and is always fully defined and open when the first movements of the rolling-board have occurred, as above described.

Normally the bunch-roller is behind apron O, but in rolling forward it passes over or upon the apron, which has been doubled beneath the roller, and thus the so-called pocket for the bunch is formed and continues as a shaping element running behind the roller to the end of the wrapping operation. But the pocket is primarily formed by the backward movement of the rolling-board out of the slack of the apron behind the portion held by suction and before the tension device Q has tilted to take the slack up, Fig. 8. Up to this time lever V has not been moved.

The open work or perforated die blank or blank-plate

G through which the wrapper is held by suction from beneath in all its positions from cutting to wrapping has the perforated portion of the apron lying directly over and upon the same and this portion is shown as perforated over a surface slightly greater in area than the size and shape of the wrapper, and hence when the said blank is raised into die c the apron is stretched over it and the parts remain in this relation as said blank is lowered flush with the rolling-board, and it is only necessary in this operation that the perforations or openings in said parts be numerous enough to perform the single function of holding the wrapper in the position in which it was cut until wrapping has occurred. For this reason also, the apron is permanently fixed to the rolling-board and has a perforated portion adapted to coöperate with the open work blank G through which the exhaust acts in holding the wrapper.

The shapes of cigars vary from being full diameter of cigar at the tuck to a very small diameter, or as is commonly known as a "pinch tuck", swelling quickly to largest diameter and tapering away again to the head of the cigar. In order to tightly and smoothly wrap such varying shapes, the rolling board is pivoted at $d^5$, as described, said pivot being located to the rear of blank-plate G and between the initial or tuck end and head end of the bunch, and is shown as being much nearer the tuck end than the head end. The position of said pivot may, however, vary somewhat as to distance in rear of blank-plate G and from the initial or tuck end, but will always be to the rear of blank-plate G and between tuck and head ends.

The act of rolling a cigar is as follows: After cutting wrapper and depositing paste on head end of cut wrapper the rolling board moves on its reciprocating carriage to the left or toward the rolling-arm. At the same time the free end of the rolling board, swings toward the operator by action of the cam slot 2 and pin 3 located on the under side of the rolling-board and rotates said board on pivot $d^5$, the cut wrapper being firmly held in position by atmospheric pressure is now in proper position for rolling, the tuck end of cut wrapper having been brought well under the bunch roller. The bunch having been deposited on the apron, as above described, the roller arm V is moved forward and cloth holder, or tension device, Q, by its upward action at once takes up the slack in the apron around the tuck end of the bunch. The initial or tuck end of wrapper is now partially wound around the bunch. The rolling-board now swings on its pivot $d^5$ and moves more rapidly than rolling-arm, and thus stretches wrapper around tuck end of bunch. By this action the initial or tuck end of wrapper is thrown in the same direction as the roller-arm moves, and the other end of the wrapper moves toward the roller, moving as it does on the arc of a circle whose center is at $d^5$. At the same time the wrapper being held firmly to the rolling-board by atmospheric pressure and the tuck-end being pressed tightly against the bunch by the apron, the wrapper is stretched and tightly and smoothly wound around the tapering tuck end of the bunch. This action is the same on a non-tapering tuck, differing only in the degree of action. The cigar is now wrapped to its point of greatest diameter, as seen in Fig. 18. Continuing the movement of roller R to the right completes the wrapping of the wrapper spirally on the bunch to its mouth end, the rolling board and apron thereon carrying the wrapper toward the larger diameter of roller R where the slack of the apron is taken up by the roller and its relation to the apron and winding the wrapper tightly upon the bunch from start to finish and finally discharging the completed cigar over the edge of the rolling board and through opening $a^4$ in the table.

What I claim is:—

1. In a cigar machine, a rolling board and a wrapping apron thereon, a wrapper supporting die-plate adapted to rest upon said apron and said board, means for raising said plate horizontally above said apron and said board, and a wrapping roller for said apron adapted to run over said board when the die plate is raised.

2. The rolling board and the die plate mounted thereon and adapted to be raised bodily to a plane above said board to give a free working space beneath said plate when raised, and mechanism to lift said plate.

3. The rolling board and a vertically movable flat surfaced perforated part therein, a die plate having an opening to receive said part and adapted to be raised to a plane above said board and said part to permit free working beneath said plate, means to elevate said plate, and means to raise said part within the opening of said die plate when said plate is in a position of rest upon said rolling board.

4. In a cigar machine the rolling board and a perforated part therein adapted to provide a flush and continuous flat top surface with the top surface of said board while the cigar is being wrapped, a die plate adapted to rest upon said board, and means to elevate said die plate to a higher plane than said board.

5. The rolling board and a perforated part therein adapted to provide a flat surface flush and continuous with the flat top of said rolling board, a perforated apron adapted to rest upon said board and said part, a die plate adapted to rest upon said apron and said board, means to raise said part, and means to raise said die plate to an elevation free of and above said apron and rolling-board.

6. In a cigar machine, a movable rolling board and a perforated plate therein adapted to rest with its top on the same plane as the top of said board, in combination with a die-plate having an opening to receive said perforated plate, means to raise said perforated plate within said opening, and means to raise said die-plate free from said board.

7. In a cigar machine, a rolling board having an opening and a vertically movable perforated plate adapted to temporarily rest therein with its top surface on the same plane as the top of said board, means to slide said board, and means to raise said plate as said board is slid along.

8. In a cigar machine, a laterally movable rolling board having a vertically movable perforated plate mounted therein, means to move said board, and means to raise and lower said plate at intervals, in combination with a movable die-plate having an opening adapted to receive said perforated plate, and means to operate said die-plate.

9. The combination of a rolling board supported to move horizontally and mechanism to operate said board, with a die plate having an opening within the die edges and adapted to rest upon said rolling board, and means to raise said plate to a plane above and free from said rolling board.

10. The means for pasting a wrapper, comprising a horizontal shaft and a supporting bracket therefor pivoted to swing horizontally, a paste distributer on said shaft, means to rotate said shaft and tilt said paste distributer and means to oscillate said bracket horizontally, substantially as described.

11. In a cigar machine, a rolling board, a wrapper cutting die plate provided with a discharge opening for the cut wrapper, means to cut the wrapper, means to elevate the die plate to a plane above the rolling board to permit wrapping of the bunch upon said rolling board, and means to hold the cut wrapper upon the rolling board when said die plate is elevated.

12. In a cigar machine, a rolling board and a wrapper cutting die plate supported upon the upper face of said board and provided with a discharge opening for the cut wrapper, means to cut the wrapper, a perforated portion within said rolling board arranged beneath said opening, means to elevate said die plate to leave said wrapper upon said rolling board, and suction means to hold the wrapper when said die plate is raised.

13. In a cigar machine, a rolling board and a die plate adapted to rest thereon having a central through opening with an upwardly extending cutting edge about said opening upon the top face of said plate, and means to elevate said die plate to transfer said wrapper to the rolling board through said opening.

14. The paste-distributer support having a fixed vertical pivot, the die-plate and means to raise the same operatively engaged by said support and oscillating the same, substantially as described.

15. The combination of the wrapper-cutting die-plate and a standard thereon provided with a cam, a paste distributer operatively engaged by said cam during its movement and means to raise and lower said standard, substantially as described.

16. In a cigar machine, a rolling board and a wrapper supporting die plate adapted to rest upon its upper face during cutting operations, an opening with upwardly projecting cutting edges in said die plate, means to hold the cut wrapper on said rolling board, and means to raise said die plate to permit the wrapping of the bunch on said rolling board beneath said plate.

17. The paste distributer and a rotatable shaft on which it is fixed, and a horizontally rotatable bracket carrying said shaft, in combination with means to rotate said shaft and tilt said distributer, and means to actuate said bracket comprising a vertical moving die-plate and cam connected therewith, substantially as described.

18. A cigar-machine having a working table, a rolling-board thereon and a pivot pin on which said board is horizontally movable, and a reciprocating carriage for said pivot pin, substantially as described.

19. In a cigar machine, a table and a rolling-board for the bunch adapted to move horizontally over the table, and having a pivotal connection with a reciprocating carriage, and means to operate said carriage, substantially as described.

20. In a cigar machine, a table having a tension device and a rolling-board, an apron attached at its ends to said device and board, respectively. a reciprocating pivot and carriage for said board, and means to move said carriage, substantially as described.

21. In a cigar machine, a table, a rolling-board thereon, a pivot for said board movable in respect to the table, and means to reciprocate said pivot and means to oscillate said board over the table, substantially as described.

22. In a cigar machine, a table and a rolling-board having an oscillating horizontal movement on said table, in combination with a pivoted lever having a bunch roller adapted to travel horizontally on an arc over said rolling-board, substantially as described.

23. In a cigar machine, the table and the rolling-board thereon and a movable pivot for said board supported on said table, in combination with means to move said pivot and to oscillate the board thereon, the said board being so constructed as to govern the extent of its oscillations.

24. In a cigar machine, a horizontally oscillating rolling-board and a carrier therefor provided with a pivot for the board, said board having a substantially right angled slot and a pin free therein and fixed to limit the oscillation of the board, substantially as described.

25. In a cigar machine, the rolling-board provided with a substantially right-angled slot and a straight slot and a pivot on which said board is adapted to oscillate, in combination with an actuating arm engaged in said straight slot and a projection engaged in said right-angled slot, substantially as described.

26. In a cigar machine, a rolling-board and a pivot support therefor, and said board constructed with slots to limit its rotation on said support, in combination with a rocking-arm slidably engaging in one of said slots, substantially as described.

27. In a cigar machine, a table and a reciprocating carriage thereon provided with a pivot, a rolling-board engaged on said pivot and provided with slots, a rocking-arm engaged in one of said slots and a fixed projection in the other of said slots, and separate means for operating said carriage and said rocking-arm, substantially as described.

28. In a cigar machine, a table and a perforated rolling board thereon, and means to give said board a direct and an oscillatory movement simultaneously, a perforated apron over said board and a suction chamber beneath said board, substantially as described.

29. In a cigar machine, a perforated rolling-board and means to horizontally oscillate the same, and a perforated apron over said board, in combination with a lever and a bunch-roller on the lever behind said apron to roll the bunch, substantially as described.

30. In a cigar machine, a rolling-board and means to reciprocate and horizontally oscillate the said board simultaneously, and an apron fixed to said board at one end and to a tension device at the other end, in combination with a lever and a bunch-roller thereon, substantially as described.

31. In a cigar machine, a rolling-board and a pivot therefor and means to give said board horizontal oscillating movements, in combination with a pivoted lever having a bunch-roller constructed to travel on an arc over said rolling-board, and a rolling apron, substantially as described.

32. In a cigar-machine, a perforated rolling-board and a traveling pivot therefor, means to move said pivot and means to move said board on its pivot, in combination with a lever, and a bunch-roller thereon and an exhaust chamber beneath said board, substantially as described.

33. In a cigar machine, a lever and a bunch-roller R having a smooth peripheral surface from end to end on a compound curved line and of larger diameter at one end, a stationary vertically adjustable support 4 for one end of said roller depending from said lever and a vertically movable spring pressed support 5 adjustably mounted upon said lever for the opposite end of said roller.

34. In a cigar machine, a lever and a bunch-roller having a smooth peripheral surface from end to end on a compound curved line and provided with vertically adjustable supports carried by said lever, and a spring bearing down upon one of said supports, substantially as described.

35. In a cigar machine, a bunch-roller having a gradual taper to a larger cross-section from its middle portion to one end and a lever carrying said roller, in combination with a perforated horizontally oscillating rolling-board, a perforated rolling apron on said board, an exhaust chamber beneath said board and a tension device connected with one end of said apron, substantially as described.

36. In a cigar machine, a perforated rolling-board and means to move said board horizontally, a perforated rolling apron attached to said board at one end and to a tension device at the other end, in combination with a lever pivoted to swing in an arc over said board and a bunch-roller thereon, and an exhaust chamber beneath said apron, substantially as described.

37. In a cigar machine, a main table, a rolling-board and a pivot therefor, and an apron attached to said board at one end and to a tension device at the other end, in combination with a lever, a bunch roller on said lever behind said apron and means between said lever and said board constructed to horizontally oscillate the board on its pivot as the lever is moved forward, substantially as described.

38. In a cigar machine, a rolling board and a fixed pivot therefor and an arm slidably engaging said board, in combination with a bunch-roller, a lever carrying said roller and mechanism operatively connecting said lever with said arm, whereby as said lever is moved the arm is moved also and the rolling-board is turned on its pivot, substantially as described.

39. In a cigar machine, the combination of an oscillating rolling board with a movable pivot therefor, means to carry said board and pivot together to one position, and separate means to oscillate said board on a horizontal plane.

40. In a cigar machine, a rolling-board, an apron secured at one end thereto and a tension device to which the other end of the apron is affixed, in combination with a lever and a bunch-roller thereon and means connected with said lever to rock said device downward at its front in the backward movement of the lever, substantially as described.

41. A cigar machine substantially as described, comprising a rolling-board, a reciprocating carrier pivotally connected with said board, and means to move said carrier first rearward and then forward, in combination with a perforated apron over said board, a lever pivoted to swing horizontally over said board and a bunch-roller on said lever behind said apron, substantially as described.

42. In a cigar machine, a bunch-rolling-apron, a rolling-board engaged on a movable pivot near one end and free to move laterally on the other end, and a tension device for the apron pivoted on fixed supports, said apron being attached at one end to the free end of the rolling-board and at the other to said tension device, means to move said board and its pivot, and a bunch roller movable over said apron, whereby the tension on said apron from the tension device shifts with the rolling of the bunch, substantially as described.

43. In a cigar machine, a pivoted and horizontally movable rolling-board, a tension device for the apron supported on a fixed pivot and an apron attached at one end to said device and at the other end to the outer end of said rolling-board, and a bunch-roller pivoted to travel in an arc over said rolling board and apron, substantially as described.

44. In a cigar machine, the combination of a vertically movable die-plate and means to raise the same, a rolling-board below said die-plate, an apron between said board and die-plate, and a wrapper-cutting-roller adapted to move across the die-plate to cut a wrapper, substantially as described.

45. A cigar-machine having a table with an opening therein, in combination with a die-plate open inside and a die therein, a rolling-board below said die-plate over the opening in the table, an apron interposed between the rolling-board and die-plate, a wrapper-cutting-roller adapted to move across the die-plate to cut a wrapper, means for elevating the die-plate after a wrapper is cut, and means for horizontally reciprocating the rolling-board simultaneously with the movement of the die-plate, substantially as described.

46. In a cigar machine, the combination of a reciprocating rolling board, reciprocating means for said board, an apron attached at one end to said rolling board and having a pocket formed therein for the bunch at its other end, means for moving the pocket and bunch over the rolling board, and means for imparting an arc movement to the rolling board during the period in which the said pocket and bunch is passing thereover.

47. In a cigar-machine, the combination of a rolling-board having openings therein conforming to the shape of a wrapper, an apron over said rolling-board and secured thereto and having a pocket formed therein, and a bunch-roller over said apron in front of said pocket, whereby a traveling pocket is moved over the rolling-board, and means for imparting movements to said rolling-board prior to the initial movement of the pocket and during the movement thereof over the rolling-board, substantially as described.

48. In a cigar machine, the combination of a rolling-board, a reciprocating carriage on which said rolling-board is pivoted, means to give said board arc movements on said pivot and connections by means of which said rolling-board is given direct movements through said carriage, an apron attached to said rolling-board, and a bunch-roller adapted to produce a pocket in said apron over the rolling-board, substantially as described.

49. In a cigar machine, the combination of a rolling-board having perforations conforming to the shape of a cut wrapper, a suction-chamber below said rolling-board, an apron over said rolling-board and attached to one end thereof, said apron having perforations conforming to the shape of a cut wrapper, a bunch-roller, a carriage for moving said rolling-board to position to form a pocket beneath said roller, and means for imparting an arc movement to said rolling-board to change the positions of the wrapper thereon during the period in which a bunch is being rolled over said rolling-board, substantially as described.

50. In a cigar machine, the combination of a rolling-board, a reciprocating carriage with which said rolling-board has a pivotal connection and by which it is given its initial movement, pivotal connections with said rolling-board whereby an arc movement is imparted thereto during the movements imparted to said rolling-board by its connection with the said carriage, an apron above said rolling-board and secured thereto, a bunch-roller and a tension device for said apron, whereby said pocket-apron is given the proper tension during the movement of the pocket over the rolling-board, and means for actuating the carriage to which the rolling-board is pivoted, substantially as described.

51. In a cigar machine, the combination of a die-plate having an opening therein conforming to the shape of a wrapper to be cut, a knife edge surrounding said opening, means for moving said die-plate vertically, a rolling-board beneath said die-plate, a reciprocating carriage to which said rolling-board is pivoted and by which said rolling-board is given its initial movement, pivotal connections with said rolling-board by means of which variable arc movements are transmitted thereto during the movement of the rolling-board by the carriage, an apron attached to the rolling-board, said apron projecting partially into the opening in the die-plate when said die-plate is lowered upon the rolling-board, a cutting-roller movable over the knife edge on the die-plate, a movable pasting device and means for moving the same simultaneously with the elevation of the die plate to paste the final end of a wrapper which is left on the rolling-board after the elevation of the die-plate, substantially as described.

52. In a cigar machine, the combination with a table having an air chamber therein, a carriage located above said air chamber, a rolling-board having a pivotal connection with said carriage, an apron secured to said rolling board and to a pivotal head, a bunch roller mounted below said apron, means for operating said rolling-board so as to move said apron to a position to form a pocket under said roller prior to an initial movement of the roller, such movement of the rolling-board being imparted by the carriage, connections with said rolling-board which co-act with the pivotal connection between said rolling-board and the carriage to impart to said rolling-board the proper movement in the formation of said pocket, substantially as described.

53. In a cigar machine, a table and a pivoted horizontally oscillating rolling-board thereon, a perforated blank plate upon said board and a perforated apron over said plate and board, in combination with a horizontally moving lever having a bunch-roller.

54. In a cigar machine, the combination of a movable die-plate, a wrapping cutting roller adapted to move over said die-plate, means for elevating the die-plate after each operation of cutting the wrapper by said roller, and means for placing the wrapper around the bunch after the elevation of the die-plate.

55. In a cigar machine, the combination of a movable die-plate having air holes surrounding the die therein, a wrapper cutting roller adapted to move over said die-plate, means for raising the die-plate, pasting mechanism adapted to apply paste to the final end of the wrapper, and means for placing a wrapper around a bunch after the elevation of the die-plate.

56. In a cigar machine, the combination of a vertically movable die-plate, a rolling-board beneath said die-plate, an apron interposed between said rolling board and die-plate, and a cutting roller adapted to be moved over the die in said die-plate.

57. In a cigar machine, the combination of a die-plate having an opening therein, a rolling-board below said die-plate, a perforated blank in said rolling-board adapted to enter within the die opening, a perforated apron resting over the perforated blank when said die-plate is lowered upon the rolling-board, a wrapper cutting roller movable over the die in said die-plate to cut a wrapper, and means for elevating the die-plate after each operation of cutting a wrapper thereon.

58. In a cigar machine, the combination of a die-plate having an opening therein surrounded by a cutting edge, means for moving said die-plate vertically, a perforated blank plate adapted to enter the opening in said die-plate when lowered, an apron above said die-plate projected into said opening when the die-plate is lowered, perforations in said apron for the suction for the wrapper, and a cutting roller movable over the die-plate.

In testimony whereof I affix my signature, in presence of two witnesses.

LESTER A. SCHAEFFER.

Witnesses:
R. J. McCARTY,
JOHN W. KALBFUS.